United States Patent
Van Gassel

(10) Patent No.: US 7,869,316 B2
(45) Date of Patent: Jan. 11, 2011

(54) DETERMINING BUFFER REFILLING TIME WHEN PLAYING BACK VARIABLE BIT RATE MEDIA STREAMS

(75) Inventor: Jozef Pieter Van Gassel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 249 days.

(21) Appl. No.: 10/579,419

(22) PCT Filed: Nov. 4, 2004

(86) PCT No.: PCT/IB2004/052305

§ 371 (c)(1),
(2), (4) Date: May 15, 2006

(87) PCT Pub. No.: WO2005/050641

PCT Pub. Date: Jun. 2, 2005

(65) Prior Publication Data

US 2007/0097816 A1    May 3, 2007

(30) Foreign Application Priority Data

Nov. 18, 2003   (EP)   ................................. 03104246

(51) Int. Cl.
*G11B 20/10*   (2006.01)
(52) U.S. Cl. .................. 369/47.33; 369/47.3; 369/47.31
(58) Field of Classification Search .............. 369/47.33, 369/47.3, 47.31
See application file for complete search history.

(56) References Cited

U.S. PATENT DOCUMENTS 5,799,197 A    8/1998   Juso et al.
5,802,032 A *  9/1998   Jacobs et al. .............. 369/59.11
5,822,288 A * 10/1998   Shinada .................... 369/47.33
6,484,233 B1  11/2002   Fujinami et al.
6,535,470 B1 * 3/2003   Wu ............................ 369/53.3

(Continued)

FOREIGN PATENT DOCUMENTS

EP        0782137 A2    7/1997

(Continued)

OTHER PUBLICATIONS

Jan Korst et al, "Algorithms in Ambient Intelligence", Chapter 15, Published by Kluwer Academic Publishers, pp. 277-290, 2004.

*Primary Examiner*—Wayne R Young
*Assistant Examiner*—Dionne H Pendleton

(57) ABSTRACT

A playback device for playback of a media stream stored on a storage medium, the device includes a controller for controlling the reading, buffering and playback of the media stream. During playback, a buffer is filled by a reader and emptied by a playback unit. At each buffer, filling a buffer refilling time, i.e., the moment when the buffer will be empty and thus has to be refilled, is calculated. After each buffer filling, the storage medium can change to standby mode till buffer refilling is to occur. Thus, power consumption by the storage medium is minimized. The buffer refilling time depends on the total consumption time and the buffer filling period. The total consumption time is determined depending on playback mode control information. The buffer filling period is calculated depending on information about the retrieval of the media stream or an estimation of the buffer filling period is made.

13 Claims, 4 Drawing Sheets

U.S. PATENT DOCUMENTS

| | | | |
|---|---|---|---|
| 6,865,627 B2* | 3/2005 | Wu | 710/57 |
| 7,194,191 B2* | 3/2007 | Tada | 386/83 |
| 7,373,413 B1* | 5/2008 | Nguyen et al. | 709/231 |
| 2002/0018410 A1 | 2/2002 | Ueke | |
| 2003/0067847 A1* | 4/2003 | Silvester | 369/30.23 |

FOREIGN PATENT DOCUMENTS

| | | |
|---|---|---|
| EP | 0847197 A1 | 6/1998 |
| EP | 0953977 A1 | 3/1999 |
| EP | 0932153 A2 | 7/1999 |
| EP | 0952577 A2 | 10/1999 |
| EP | 1249838 A1 | 10/2002 |
| EP | 1465181 A1 | 10/2004 |
| JP | 11242853 A | 9/1999 |
| JP | 2001084703 A | 3/2001 |
| WO | 0028544 A1 | 5/2000 |

* cited by examiner

DETERMINING BUFFER REFILLING TIME WHEN PLAYING BACK VARIABLE BIT RATE MEDIA STREAMS

The invention relates to a playback device for playback of a media stream stored on a storage medium, the device comprising reading means for reading a part of the media stream, a buffer for holding the part of the media stream, a playback unit for consuming the part of the media stream from the buffer at a predefined rate, and control means for controlling the reading of the media stream from the storage medium, the filling of the buffer and the playback of the media stream.

The invention further relates to a method for playback of a media stream from a storage medium, the method comprising the steps of reading at least a part of the media stream, holding the part of the media stream in a buffer, playing back the part of the media stream from the buffer at a predefined rate, and controlling the reading of the media stream from the storage medium, filling of the buffer and the playback of the media stream.

The invention also relates to a computer program product.

The article "Saving energy in portable multimedia storage" by Jan Korst, Joep van Gassel, and Ruud Wijnands, published as chapter 15 (page 261-274) of "Algorithms in ambient intelligence", published in 2003 by Kluwer Academic Publishers describes strategies for saving energy in portable multimedia disk based storage devices.

One strategy of saving energy is putting the storage medium in standby mode after reading part of the media stream, being a video or audio stream. This storage medium can for example be a hard disk drive (HDD) or an optical disk (e.g. CD or DVD). On playback data of the media stream is read from the storage medium into a buffer. Meanwhile a playback unit is consuming data from the same buffer at a predefined rate. When playing back constant bit rate media streams the consumption rate is constant at a fixed amount of bits per second. When playing back variable bit rate media streams the consumption rate varies, depending on the actual bit rate of the part of the media stream to play. When the buffer is almost empty new data is read from the storage medium into the buffer. When the storage medium is for example a HDD, the disk can spin down in order to save energy after the buffer is filled. Just before new data is read from the disk into the buffer the disk is spun up again. The buffer refilling time is the amount of time between two successive buffer fillings, wherein the disk is spun down, no data is transported from the storage medium to the buffer, and the media stream is consumed from the buffer. For constant bit rate media streams the buffer refilling time is calculated from the bit rate of the media stream and the size of the buffer.

For variable bit rate media streams it is not clear what the actual bit rate of each part of the stream is. For variable bit rate media streams the buffer refilling time is therefore estimated based on the peak bit rate of the entire media stream, which is usually much higher than the average bit rate. Since this is a worst case number, the buffer will generally still contain data when this calculated refilling time has passed. Refilling of the buffer, although perhaps far from empty, will result in a more frequent than necessary spinning up of the disk, resulting in an increase in power consumption.

A better strategy mentioned in said article is to calculate a new buffer refilling time when the buffer does not need a refill at the first calculated refilling time. The refilling time has to be recalculated numerous times and buffer fullness has to be checked frequently. The calculation needs to be done with increasing frequency until the buffer is finally to be refilled.

Determining the buffer refilling time is one of the most complicated tasks of a buffer scheduler and therefore complicates the scheduler design and makes the whole refilling process indeterministic in nature. Checking the buffer fullness too late will cause a buffer under run and will result in the playback unit not being able to present seamless playback.

It is an object of the invention to provide a playback device of the kind set forth in the first paragraph which reduces power consumption while minimizing the risk of buffer under runs.

With the playback device of the invention this object is realized in that the control means comprise means for retrieving playback mode control information, and means for calculating a buffer refilling time depending on the playback mode control information.

Playback mode control information is stored with the media stream or elsewhere on the storage medium for playing back the media stream in a selected playback mode. The playback mode control information conditions when a part of the media stream has to be read, transported, decoded or played back when playing back the media stream in a selected playback mode. Possible playback modes are for example normal speed playback, fast forward, playing backward, skipping parts of the media stream, random playback or slow motion. For different playback modes, parts of the media stream are played back in differently timed sequences depending on the playback mode control information.

The moment that each part of the media stream is played back is defined by the playback mode control information and the selected mode of playback. The buffer will be empty when the last part of the media stream is consumed by the playback unit. In this invention playback mode control information concerning the part of the media stream in the buffer is used to determine when the buffer will be empty. When the buffer is refilled before the calculated buffer refilling time, i.e. the moment it would be totally empty, no buffer under run can occur.

Every time the buffer is filled a calculation of the next buffer refilling time is done, allowing the storage medium to spin down in order to decrease energy consumption. Decreased energy consumption results in saving power and decreasing heat production. Heat production could be harmful to the device. As spinning up of the storage medium is postponed till the buffer refilling time, the number of spin ups and the power needed for spinning up the storage medium will be minimized. The architecture of the scheduler is significantly simplified because no additional checking of the buffer fullness or recalculation of the buffer refilling time is required. The accurate calculation of the buffer refilling time eliminates the chance of the buffer unexpectedly being empty because buffer refilling is done too late, causing a buffer under run.

This invention relies on the fact that most predefined media stream formats comprise playback mode control information for enabling different playback modes. The playback mode control information is retrieved and used for calculation of the buffer refilling time. The calculation can be done although no specific information for controlling the buffer refilling process is enclosed in such predefined media stream formats.

In an embodiment of the playback device according to the present invention the playback mode control information is retrieved from characteristic point information.

Characteristic point information (CPI) comprises tables of locations within the media streams which are suitable for navigating when playing back in different playback modes.

For example CPI is enclosed in the predefined logical disc format of Blu-ray Disc, which conditions the way the media stream is stored.

Another embodiment of the playback device according to the present invention is provided in which the control means are arranged for calculating the amount of time needed for buffer refilling depending on information concerning retrieval of the media stream.

The calculation of the buffer refilling time is based on the moment in time when the buffer will be totally empty. The process of filling the buffer takes up some time. The refilling of the buffer therefore has to be started some time before the buffer is totally empty and has to be completed at the moment the buffer would be totally empty if no refilling would take place at all. If no information about the amount of time needed for filling the buffer is available, buffer refilling has to start a predefined worst case time period before the buffer would be totally empty. Calculating the amount of time needed for buffer refilling contributes to the accuracy of the determination of the buffer refilling time. A more accurate determination of the buffer refilling time makes it possible to further reduce power consumption while minimizing the risk of buffer under runs.

Another embodiment of the playback device according to the present invention is provided in which the control means are arranged for using information about the location of the part of the media stream on the storage medium for calculating the amount of time needed for buffer refilling.

The location of the content on the storage medium may affect the speed of retrieval. Hard disks and Blu-ray disks for example rotate with a constant angular velocity and a constant information density all over the disk. Thus the outer part of the storage medium, because of its greater diameter has a greater circumference than the inner part of the storage medium. From the outer parts of the storage medium a greater part of the media stream is read per rotation of the storage medium, resulting in a smaller amount of time needed for buffer refilling and less power consumption required for a buffer refilling.

Another embodiment of the playback device according to the present invention is provided in which the control means are arranged for using information about the position of the disk head for calculating the amount of time needed for buffer refilling.

Moving the disk head to the position in which it can read the required part of the media stream costs time. The greater the distance between the disk head and the required part of the media stream, the more time it will cost to refill the buffer.

These and other aspects of the invention are apparent from and will be elucidated with reference to the embodiments described hereinafter.

Figure 1:
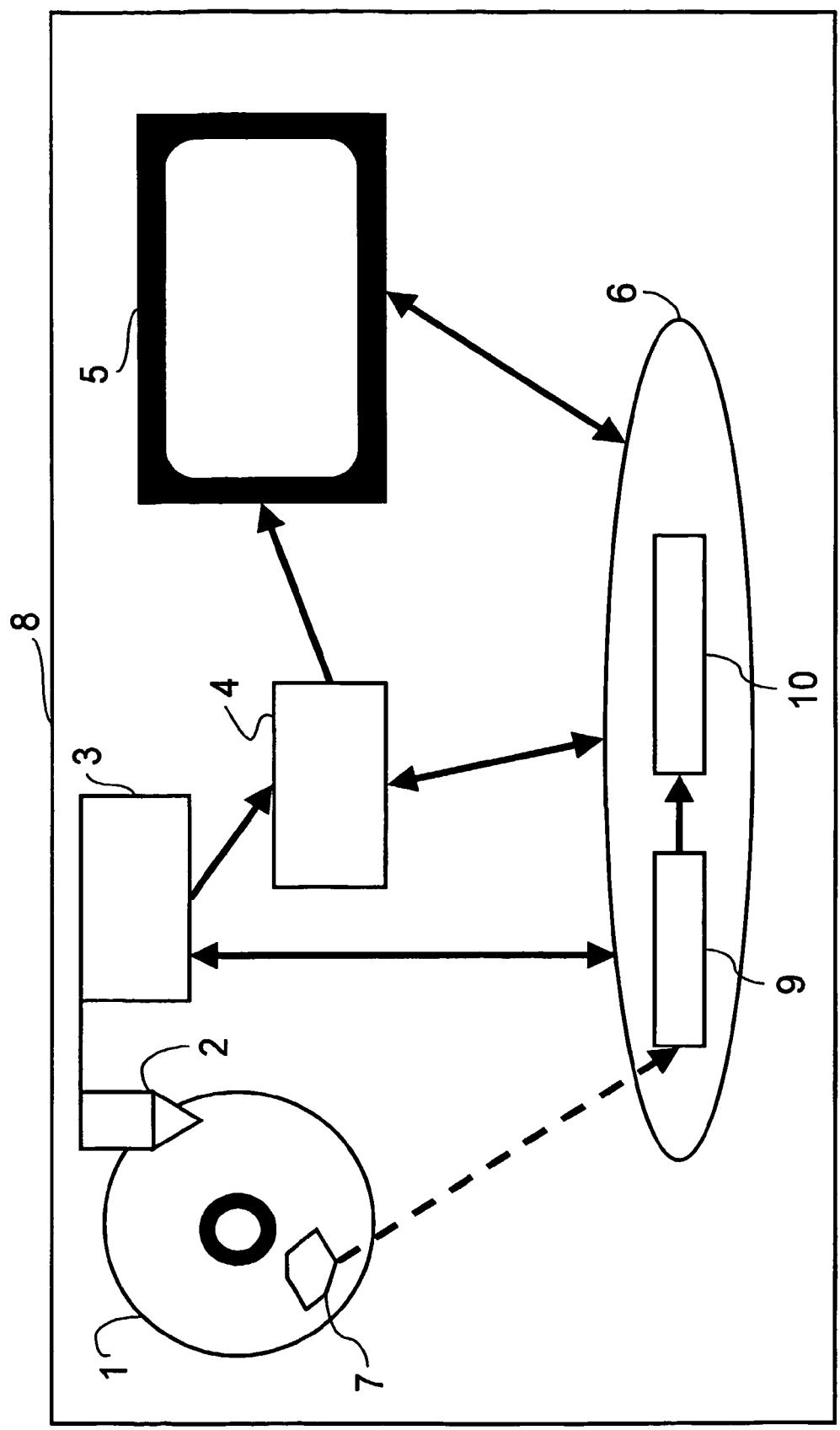
FIG. 1 is a block diagram of an embodiment of a playback device according to the present invention.

FIG. 1 is a block diagram of an embodiment of a playback device 8 according to the present invention. The playback device 8 comprises reading means for reading a media title from a storage medium 1. The reading means comprises a disk head 2 for accessing the data on the storage medium 1, a motor unit (not shown in FIG. 1) for spinning up the storage medium 1, an actuator (not shown in FIG. 1) for moving the disk head 2 to its reading position and a read unit 3 for controlling the data read out process and processing the data read by the disk head 2. The playback device 8 also comprises a buffer 4, a playback unit 5 and a control unit 6 for controlling the transport of the media stream from the storage medium 1, via the disk head 2 and the read unit 3, to the buffer 4 and finally to the playback unit 5. The control unit 6 encloses a retrieval unit 9 for retrieving playback mode control information 7 and a calculation unit 10 for calculating a buffer refilling time. The playback mode control information 7 is retrieved by the retrieval unit 9 via the disk head 2 and the read unit 3.

Media streams are stored on the storage medium 1. The storage medium 1 may be a hard disk, an optical disk (e.g. CD or DVD) or any other rotary storage medium and may also be an external storage medium coupled to the playback device or a storage medium connected to the playback device via a network. The read unit 3 accounts for the filling of the buffer 4 with data of the media stream. The read unit 3 is controlled by the control means 6 to provide retrieval of the required data of the media stream from the storage medium 1 and supplies the control unit 6 with information about the reading process. The control unit 6 may for example be realized as driver software or hardware implemented by using a dedicated processor and a memory. The buffer 4 is also controlled by the control unit 6 for example to ensure correct timing of the buffer filling or to prevent the device 8 from overwriting information in the buffer 4 that still has to be played back. Information about the buffer 4 and the contents of the buffer 4 is supplied to the control unit 6. The control unit 6 also controls the transport of the media stream from the buffer to the playback unit 5 and the actual playback of the media stream. The control information for the transport of data of the media stream from the buffer 4 to the playback unit 5 for example defines the rate at which the media stream is consumed from the buffer 4 and the playback sequence for different media streams or parts of media streams.

Playback mode control information 7 is enclosed in predefined media stream formats and is for example used by the control unit 6 to retrieve the required part of the media stream from the storage medium 1, to define the rate at which the media stream is consumed from the buffer 4 and to define the playback sequence for different media streams or parts of media streams, depending on the selected playback mode. In the playback device 8 according to the present invention the playback mode control information 7 is also used to determine when the last part of the media stream will be consumed from the buffer 4 and when the buffer 4 has to be refilled in order to minimize power consumption and to provide seamless playback by the playback unit 5. In the embodiment shown in FIG. 1 the playback mode control information 7 is stored with the media stream data on the storage medium 1. The disk head 2 reads the playback control information from the storage medium 1 and via the read unit 3 the playback control information is passed to the retrieval unit 9, which extracts the useful information and passes it on to the calculation unit 10. The playback mode control information 7 may also be retrieved from system memory (not shown in FIG. 1).

Figure 2:
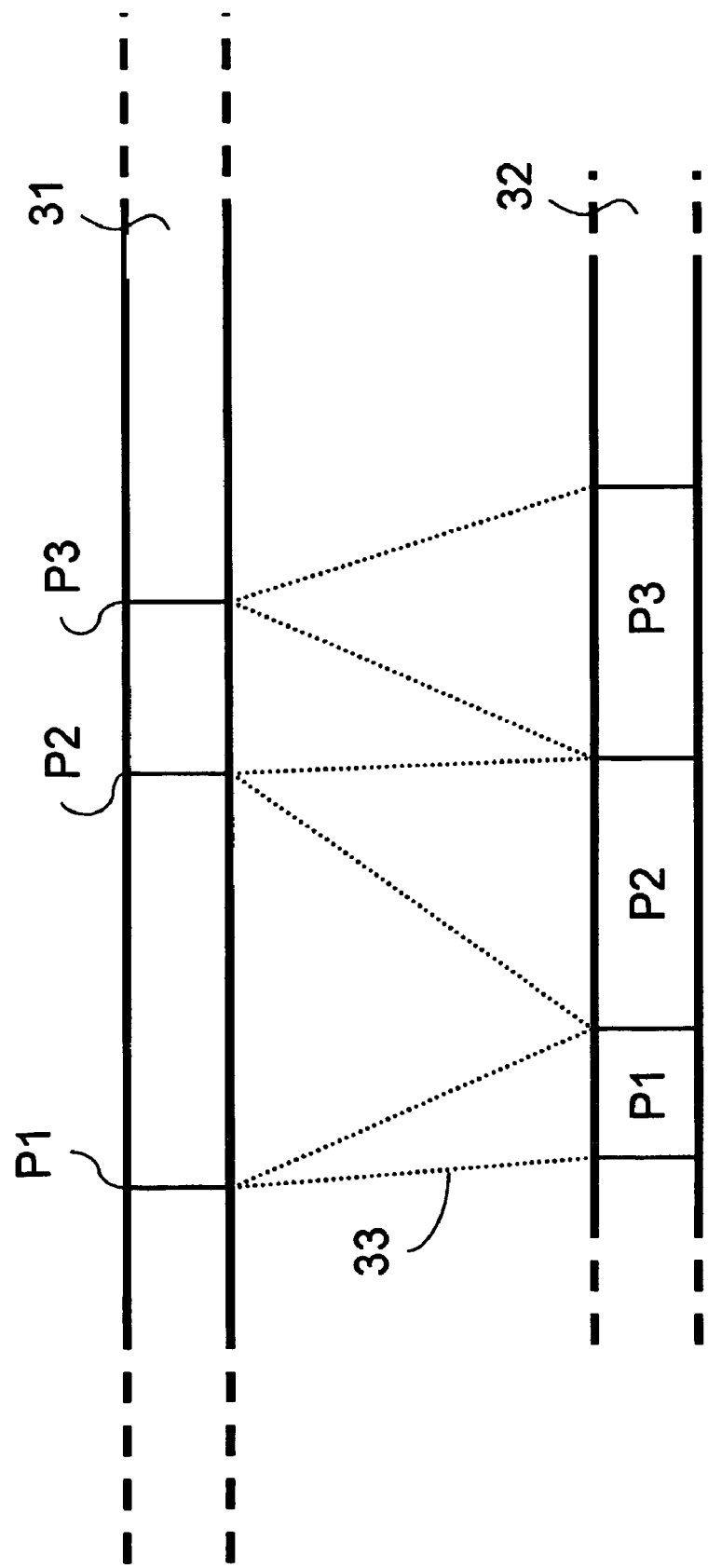
FIG. 2 is a schematic presentation of part of a media stream and corresponding CPI-information.

In an embodiment according to this invention this playback mode control information 7 is retrieved from characteristic point information 32. FIG. 2 shows part of a media stream file 31 and a corresponding part of the characteristic point information (CPI) 32. CPI comprises tables of and pointers 33 to locations within the media streams 31 which are suitable for navigating when playing back in different playback modes. CPI is used to determine the location of entry points (P1, P2, P3) for trick play (for example fast forward, fast reverse), interactive play (user chooses where to start playing a media stream) or simple editing involving clip truncation. Information about an entry point in the media stream is stored in the CPI. For an entry point the CPI can for example store the location of the entry point in the media stream or the presentation time of the part of the media stream starting at the entry point. When in fast forward mode specific CPI entry points may be used for navigating through the frames to be displayed. The CPI is stored separate from the media stream, e.g. in a special area of the storage medium or in a special file. In order to use CPI effectively, the CPI data has to be cached in system memory, so that there is no need to read or write CPI data from or to disc during time critical operations. CPI is enclosed in most predefined logical disk formats and is described in more detail in the above referenced application published as WO00/28544. The usage of other sources of playback mode control information 7 is within the scope of the present invention.

In a further embodiment of the playback device 8 the calculation unit 10 is arranged for calculating the amount of time needed for buffer refilling depending on information concerning retrieval of the media stream. This information is for example information about the location of the required part of the media stream on the storage medium 1 or information about the position of the disk head 2. The information about the location of the part of the media stream on the storage medium 1 is for example retrieved from file system info stored on the storage medium 1. The file system info may also be temporarily stored in system memory (not shown in FIG. 1) from which it can be retrieved. Information about the position of the disk head 2 is for example deduced from the last addresses read from the disk 1.

The playback unit 5 consumes the media stream from the buffer and transfers the media stream data to a decoding unit. The playback unit may comprise a decoding unit for decoding the encoded media stream and a display and/or a speaker for presenting the media stream to a user. The display unit or speaker unit may also be an external unit coupled to a playback device comprising the decoding unit. The device may for example be part of a home network, while the display unit or speaker unit is wirelessly coupled to the network. In another embodiment the decoding unit is an external unit. In this case the media stream is retrieved from the storage medium, held by the buffer and then sent onto the network to the external decoding unit.

With an embodiment of the invention it is possible to simultaneously playback more than one media stream or to playback a media stream while recording another media stream. In this case the buffer refilling time may be used to allow the device to read or write data from or onto the storage medium in a secondary process, when the storage medium is not needed for a primary playback process. Calculations of the buffer refilling time are made for all streams. The control unit is arranged for preventing different buffer filling periods to overlap. The control unit 6 is also arranged for refilling a buffer in time for preventing the buffer to run out of data concerning one of the simultaneously played media stream.

Figure 3:
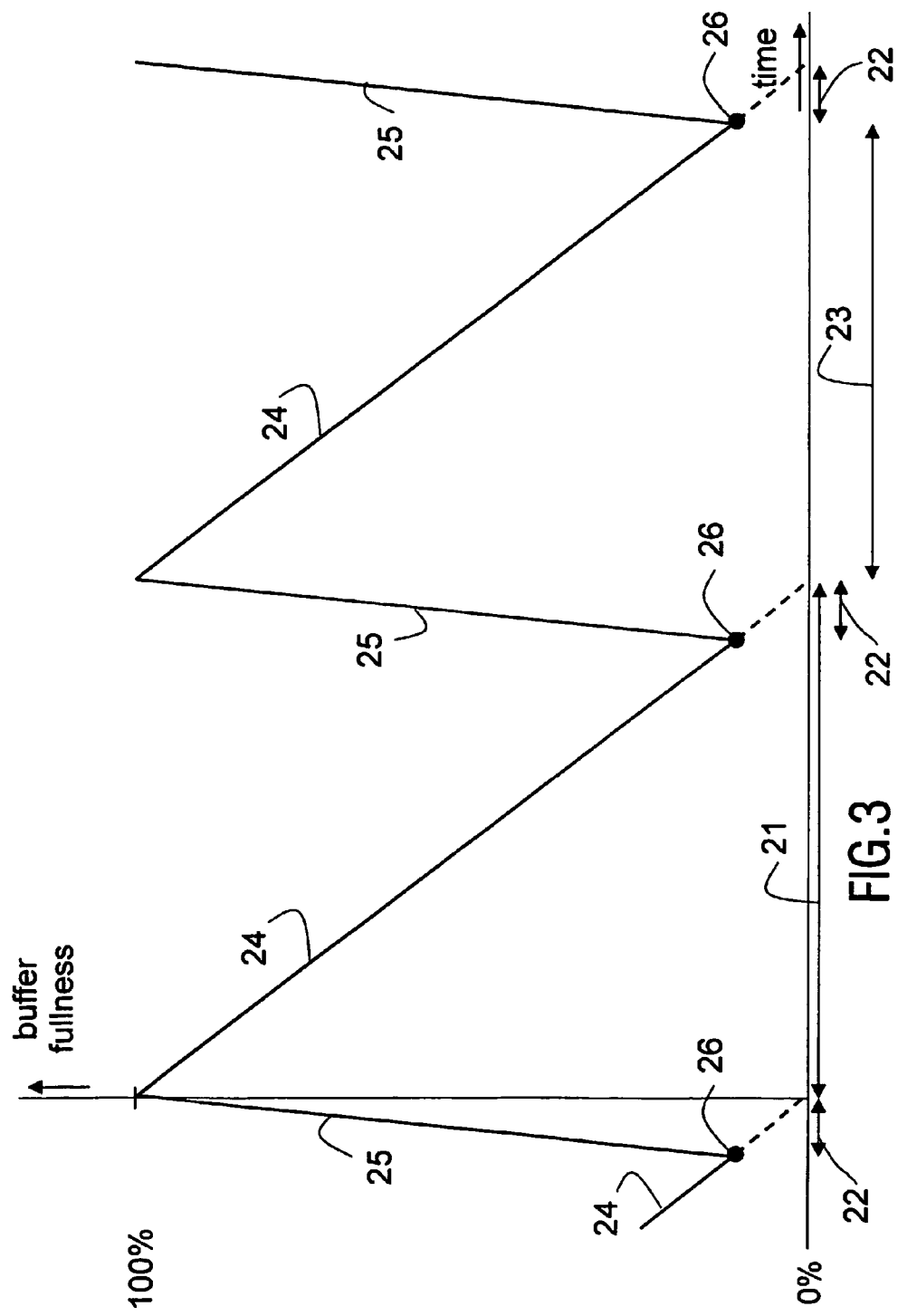
FIG. 3 shows the buffer fullness during the reading of a constant bit rate media stream from the storage medium, filling of the buffer and the playback of the media stream.

FIG. 3 shows the buffer fullness during the reading of a constant bit rate media stream from the storage medium, filling of the buffer and the playback of the media stream. In FIG. 3 the CBR buffer emptying 24, i.e. the emptying of the buffer during playback of a constant bit rate media stream, is indicated by a line segment. The filling of the buffer 25 when retrieving the media stream from the storage medium is also indicated by a line segment. The total CBR consumption time 21 is the amount of time needed to consume all data of the constant bit rate media stream held in the buffer. The buffer filling period 22 is the amount of time needed for the filling of the buffer. The total CBR consumption time 21 and the buffer filling period 22 are indicated by arrows. The CBR buffer refilling time 23 is also represented by an arrow. The moment that buffer fullness starts to increase due to refilling of the buffer is shown in the figure and indicated by the buffer refilling point 26.

When the buffer is completely filled, the playback unit starts consuming the media stream from the buffer. During playback the CBR buffer emptying 24 occurs at a constant rate resulting in a straight line in FIG. 3. As the playback unit consumes the media stream from the buffer at a constant rate and the size of the buffer is known, the total CBR consumption time 21 can be determined. During the filling of the buffer with data of the media stream, retrieved from the storage medium, the buffer fullness increases. The filling of the buffer takes a certain amount of time. This amount of time is the buffer filling period 22. Buffer refilling must be completed when all of the part of the media stream in the buffer is consumed. When the buffer filling period 22 is not known exactly, a worst case value should be estimated, to minimize the chance of buffer under runs. The buffer refilling time 23 equals the total CBR consumption time 21 minus the buffer filling period 22. After filling of the buffer, the next CBR buffer refilling time 23 is determined and the storage medium spins down in order to decrease energy consumption. When the CBR buffer refilling time 23 is elapsed, the storage medium is spun up again to enable buffer refilling.

Figure 4:
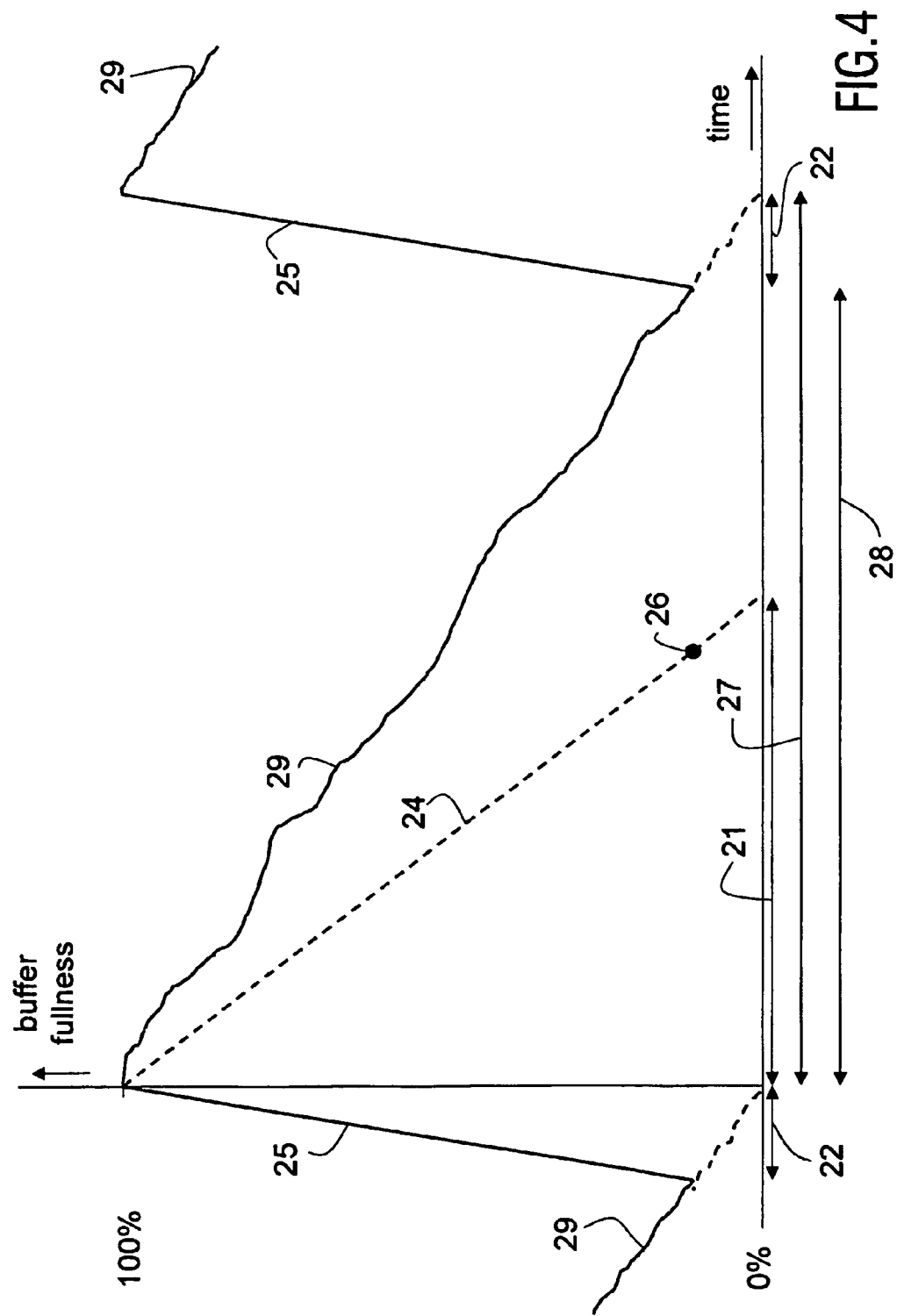
FIG. 4 shows the buffer fullness for the buffer in a playback device according to the present invention during the reading of a variable bit rate media stream from the storage medium, filling of the buffer and the playback of the media stream.

FIG. 4 shows the buffer fullness for the buffer in a playback device according to the present invention during the reading of a variable bit rate media stream from the storage medium, filling of the buffer and the playback of the media stream. In FIG. 4 the total CBR consumption time 21, the buffer refilling period 22, the CBR buffer emptying 24, the filling of the buffer 25 and the buffer refilling point 26, correspond to FIG. 3. The process of filling of the buffer and the buffer refilling period are the same for constant and variable bit rate media streams. The process of emptying the buffer and the total consumption time are not the same for constant and variable bit rate media streams. The VBR buffer emptying 29, i.e. the emptying of the buffer during playback of a variable bit rate media stream, is indicated by a curved line segment. The total VBR consumption time 27 for the playback of a variable bit rate media stream is indicated by an arrow. The VBR buffer refilling time 28 equals the total VBR consumption time 27 minus the buffer filling period 22 and is also represented by an arrow.

For variable bit rate media streams it is not clear what the actual bit rate is. Each little part of the media stream has its own bit rate. Some parts of the media stream have a high bit rate, resulting in fast emptying of the buffer. Other parts of the media stream have a low bit rate, resulting in slow emptying of the buffer. The variation in bit rate causes the line segment, representing the VBR buffer emptying 29, not to be a straight line like the line segment representing the CBR buffer emptying 24, but to have an irregular shape.

Because of the irregular shape of line segment 29 it is not possible to know exactly when the buffer will be empty without any extra information. In this invention the extra information comes from playback mode control information.

The playback mode control information comprises timing information to define the playback sequence of different parts of the media stream depending on the selected playback mode. This timing information may for example define the moment of retrieval from the storage medium, decoding or playing back the different parts of the media stream. The buffer will be empty when the last part of the media stream in the buffer is consumed by the playback unit. The total VBR consumption time 27 is determined depending on timing information concerning the different parts of the media stream in the buffer to be played back. For example when playing back in a fast forward playback mode with twice the speed of real time playback, the total VBR consumption time 27 equals half the time interval spanned by the timing information concerning the first and the last part of the media stream in the buffer to be played back. From the total VBR consumption time 27 and the buffer refilling period 22 the VBR buffer refilling time 28 is calculated. After the buffer is filled, the device can be brought into a low power consuming mode. The accurate calculation of the buffer refilling time 28 makes it possible to maintain the low power consuming mode for as long as possible, without the risk of buffer under runs. Hence power consumption is minimized.

Although the description of the invention mainly focuses on power consumption reduction, the calculating of the buffer refilling time for variable bit rate media streams may also serve other purposes. For example the buffer refilling time may be used to allow the device to read or record other data, e.g. best-effort data or other real-time streams, from or onto the storage medium in a secondary process, while the storage medium is not needed for a primary playback process.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A playback device for playback of a media stream from a storage medium, the device comprising reading means for reading at least a part of the media stream, a buffer for holding the part of the media stream, a playback unit for consuming the part of the media stream from the buffer at a predefined rate, and control means for controlling the reading of the media stream from the storage medium, filling of the buffer during a buffer filling period, and the playback of the media stream, wherein the control means comprise means for retrieving playback mode control information stored on the storage medium, and means for calculating a buffer refilling time depending on the playback mode control information, wherein the control means are arranged for calculating the buffer filling period depending on information about a location of the part of the media stream on the storage medium.

2. The playback device as claimed in claim 1, wherein the means for retrieving playback mode control information are arranged for retrieving characteristic point information and the means for calculating the buffer refilling time are arranged for calculating the buffer refilling time depending on the characteristic point information.

3. The playback device as claimed in claim 1, wherein the control means are arranged for calculating the buffer filling period depending on information about a position of a disk head.

4. The playback device of claim 3, wherein the controller is configured to store file system information stored on the storage medium in a memory of the playback device, the file system information including the information about the location of the part of the media stream on the storage medium and the information about the position of the disk head.

5. The playback device of claim 1, wherein the controller is configured to store file system information stored on the storage medium in a memory of the playback device, the file system information including the information about the location of the part of the media stream on the storage medium.

6. The playback device of claim 1, wherein the controller is configured to simultaneously playback more than one media stream or to playback a first media stream while recording a second media stream.

7. The playback device of claim 6, wherein the controller is configured to use the buffer refilling time to allow the playback device to read or write data from or onto the storage medium when the storage medium is not needed for a playback process.

8. A method for playback of a media stream from a storage medium by a device, the method comprising the acts of:
   reading at least a part of the media stream;
   holding the part of the media stream in a buffer;
   playing back the part of the media stream from the buffer at a predefined rate;
   controlling the reading of the media stream from the storage medium; and
   filling of the buffer during a buffer filling period;
   wherein the controlling act comprises the sub acts of:
   retrieving playback mode control information stored on the storage medium;
   calculating the buffer refilling time depending on the playback mode control information; and
   calculating the buffer filling period depending on information about a location of, the part of the media stream on the storage medium.

9. The method as claimed in claim 8, further comprising the act of calculating the buffer filling period depending on information about a position of a disk head of the device.

10. The method of claim 9, further comprising the act of storing file system information stored on the storage medium in a memory of the playback device, the file system information including the information about the location of the part of the media stream on the storage medium and the information about the position of the disk head.

11. The method of claim 8, further comprising the act of storing file system information stored on the storage medium in a memory of the device, the file system information including the information about the location of the part of the media stream on the storage medium.

12. The method of claim 8, further comprising the act of simultaneously playing back more than one media stream or playing back a first media stream while recording a second media stream.

13. The method device of claim 12, further comprising the act of using the buffer refilling time to allow the device to read or write data from or onto the storage medium when the storage medium is not needed for a playback process.

* * * * *